United States Patent [19]

Nourry

[11] Patent Number: 5,622,347

[45] Date of Patent: Apr. 22, 1997

[54] SUSPENSION MEMBER FOR ELECTRICAL TRUNKING

[75] Inventor: Daniel Nourry, Dijon, France

[73] Assignee: Schneider Electric SA, Boulogne Billancourt, France

[21] Appl. No.: 451,807

[22] Filed: May 26, 1995

[30] Foreign Application Priority Data

Jun. 2, 1994 [FR] France ................................. 94 06864

[51] Int. Cl.⁶ .................................................. A47G 1/10
[52] U.S. Cl. .................................. 248/316.5; 248/229.13
[58] Field of Search .......................... 248/316.5, 231.51, 248/229.13, 229.23, 49, 58, 74.1

[56] References Cited

U.S. PATENT DOCUMENTS

| 2,212,156 | 8/1940 | Erdley | 248/229.13 |
| 2,876,027 | 3/1959 | Sulmonetti | 248/229.23 X |
| 2,984,447 | 5/1961 | Duvall et al. | |
| 4,769,985 | 9/1988 | Moritz | 248/49 X |

FOREIGN PATENT DOCUMENTS

| 0375607 | 6/1990 | European Pat. Off. |
| 9103649.6 | 8/1991 | Germany . |

*Primary Examiner*—Ramon O. Ramirez
*Attorney, Agent, or Firm*—Oblon, Spivak, McClelland, Maier & Neustadt, P.C.

[57] ABSTRACT

The invention concerns a suspension member (1) for electrical trunking including clamps (2, 3) between which the trunking (5) is accommodated and a fixing member (23b) for fixing the trunking to a support (5a). One of the clamps is a pivoting clamp assembled and articulated to the suspension member by assembly and pivot means (6) and retained in a holding position on the trunking by elastic locking means (9).

8 Claims, 3 Drawing Sheets

5,622,347

SUSPENSION MEMBER FOR ELECTRICAL TRUNKING

BACKGROUND OF THE INVENTION

1. Field of the Invention

The present invention concerns a suspension member for suspending prefabricated electrical trunking including clamps between which the trunking is accommodated and a fixing member for fixing the trunking to a support and/or fixing an electrical device to the trunking.

2. Discussion of the Background

Electrical trunking is usually suspended from C-shape members having a central web and top and bottom flanges. The central web is in contact with a side wall of the trunking and a lug attached to the upper part of the trunking is screwed to it; the bottom flange supports the lower part of the trunking and the top flange is at a given height above the trunking and includes a hole for suspending the trunking by screwing it to a support.

This type of support member has the drawback of not allowing subsequent addition of further wires or cables on the top of the trunking. Its use is also time-consuming, in particular because the member must first be screwed to the trunking.

Another prior art suspension system uses collars having a median part with a hole in the middle for suspending it and two flanges each having an attachment lug which clips around the trunking.

This type of device enables suspension of the trunking and suspension of electrical devices from the trunking, so reducing the cost of a combined installation of this kind.

However, to suspend the trunking, for example from a ceiling, the median part of the collar is on top of the trunking, which makes it impossible to add further cables.

SUMMARY OF THE INVENTION

The present invention remedies the above drawbacks by providing a suspension member that is easy to fit around the trunking, of low cost, enables contiguous fixing of electrical devices to the trunking and enables the installation of additional wires held in place on top of the trunking.

The suspension member of the invention is characterised in that at least one of the clamps is a pivoting clamp assembled and articulated by assembly and pivot means and retained in a holding position on the trunking by elastic locking means.

Accordingly, the member is used both to suspend trunking from a support and to suspend an electrical device from the trunking.

The suspension member is preferably a stamped flat metal member. A plurality of such parts can then be joined side-by-side and, because of their compact size, disposed any way on the trunking.

The clamps comprise a fixed clamp to which the pivoting clamp is assembled and articulated.

The locking means preferably comprise a leaf spring pressed against a larger face of the stamped member and a locking coupling between the spring and the pivoting clamp to prevent rotation of the clamp in the holding position.

The locking coupling comprises locking notches on the pivoting clamp and locking lugs on the spring, the lugs being adapted to clip into said notches.

In a different embodiment the locking coupling comprises locking notches on the spring and locking lugs on the pivoting clamp adapted to clip into said notches.

When the suspension member is around the trunking, attachment projections on the facing clamps are pressed against the top wall of the trunking and leave on top of the trunking a free space which when the clamp is open enables insertion of the trunking and when the clamp is in the holding position accommodates additional

BRIEF DESCRIPTION OF THE DRAWINGS

The description given below with reference to the drawings indicates the features and advantages of the invention.

In the appended drawings.

DETAILED DESCRIPTION OF THE PREFERRED EMBODIMENTS

Figure 1:
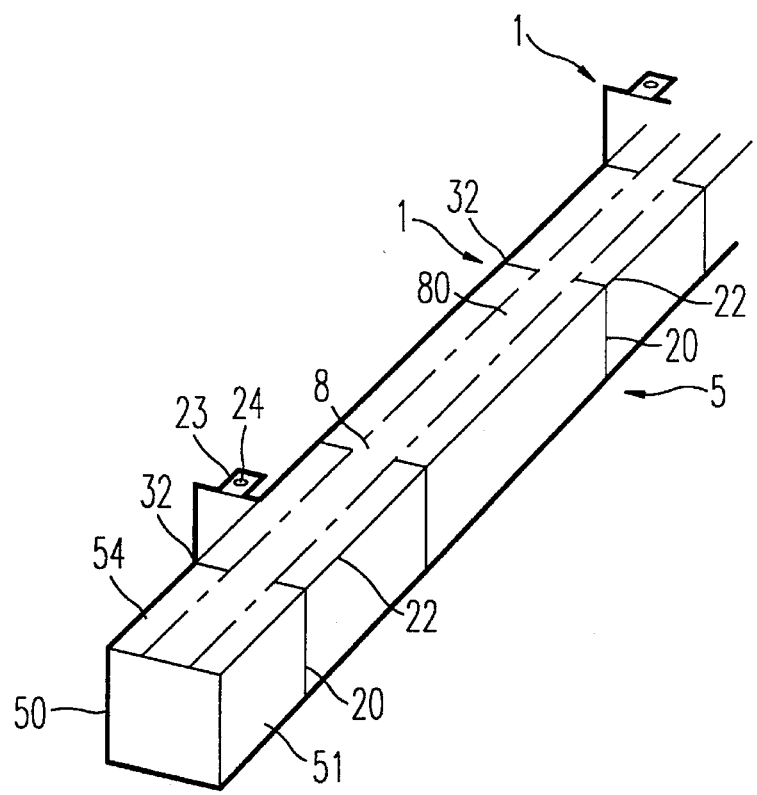
FIG. 1 is a top perspective view of trunking associated with suspension members.
Figure 2:
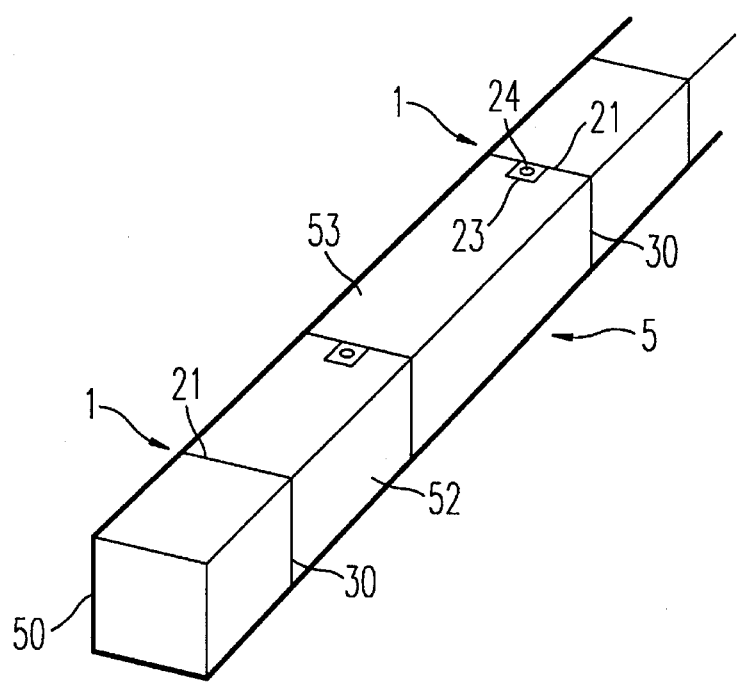
FIG. 2 is a bottom view of FIG. 1.

The suspension member 1 (FIGS. 1 to 5) is stamped and bent to shape from sheet metal. It is adapted to be fixed around prefabricated electrical trunking 5 comprising a parallelepiped-shape metal enclosure 50 with four walls: side walls 51, 52, bottom wall 53 and top wall 54.

The suspension member 1 is a flat stirrup member; it comprises a fixed clamp 2, a pivoting clamp 3 articulated to the fixed clamp and elastic locking means 4 for locking the pivoting clamp in a holding position on the trunking.

The L-shape fixed clamp 2 comprises a central web 20, a flange 21 and an attachment projection 22; the narrow edges of the web 20, the flange 21 and the attachment projection 22 are respectively adapted to bear against the side wall 51 or 52 of the trunking, to support the bottom wall 53 and to bear on the top wall 54.

The flange 21 has on one of its longitudinal surfaces an upstand 25 producing a free space between itself and the plane of the flange 21. The flange 21 also has a hole 26 at its free end.

Figure 3:
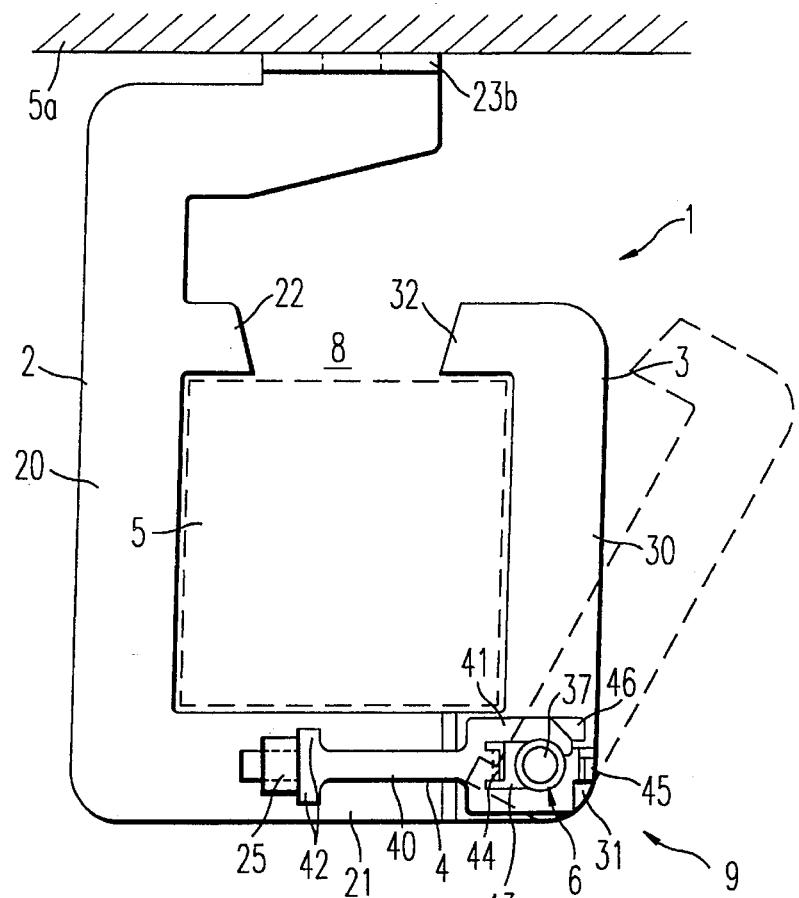
FIG. 3 is an elevation view of a first embodiment of the suspension member.

The fixed clamp 2 includes a fixing member 23 with a hole 24 and is attached either to the flange 21 (23a in FIG. 4) or to the web 20 (23b in FIG. 3). In the latter case it is used to suspend the trunking from a support 5a and in the former case it is used to suspend an electrical device 5b from the trunking. When the suspension member is mounted on the trunking, the fixing member 23 is in a plane parallel to the bottom wall 53 and the top wall 54 of the trunking.

The pivoting clamp 3 comprises a web 30 and an attachment projection 32 and an articulation part 31 at respective ends of the web 30.

The attachment projection 32 is adapted to bear on the top wall 54 of the trunking and to face the attachment projection 22 on the fixed clamp when the member 1 is around the trunking.

The articulation part 31 which incorporates a hole 36 is assembled and articulated to the end of the support flange 21 by assembly and pivot means 6, preferably a rivet 37 cooperating with the holes 26 and 36 to form a pivot joint. The rivet provides the articulation part 31 with freedom to rotate about an axis XX' perpendicular to the longitudinal axis of the support flange 21 so that the pivoting clamp can pivot between the open position shown in dark lines and the clamping portion shown in solid lines.

The elastic locking means 4 comprise a leaf spring 40 and a locking coupling 9 consisting of locking lugs 44, 45 on the spring cooperating with locking notches 34, 35 on the side faces of the web 30 of the clamp adjacent to the pivot joint.

The leaf spring 40 is used as a locking member and not as a return spring. It is removably attached to a larger face of the member 1. It then exerts a force along the longitudinal axis of the trunking. It comprises an elongate part 41a and an extension member 41b. The spring has two opposite longitudinal faces, one on the inside adapted to bear against the fixed clamp 2 and the pivoting clamp 3 and the other on the outside; the longitudinal axis YY' of the spring is parallel to the longitudinal axis of the flange 21 of the fixed clamp.

The part 41a has two projecting portions 42 acting as abutments for the part 41a to limit movement of the spring when it is engaged under the upstand 25 of the fixed clamp 2. The extension member 41b comprises a hole 43 for the rivet 37 when the spring is engaged under the upstand 25.

The locking lugs 44, 45 on the extension member 41b are bent towards the inside face of the spring perpendicularly to the longitudinal axis YY' and are disposed one on each side of the hole 43. They clip into the respective locking notches 34, 35 to prevent rotation of the pivoting clamp from the clamping position. The web 30 is at a right angle to the flange 21 of the fixed clamp and the stirrup is therefore rectangular in shape, matching that of the trunking.

In a different embodiment of the invention the locking lugs 44, 45 can be on the pivoting clamp 3 and cooperate with locking notches 34, 35 on the spring 40.

Finally, the member 41b has a tongue 46 which is bent towards the outside face of the spring. Using a simple tool, this tongue is used to lift the spring and so release the locking lugs 44, 45 from the locking notches 34, 35 to release the pivoting clamp.

The operation of the device of the invention will now be described.

Figure 4:
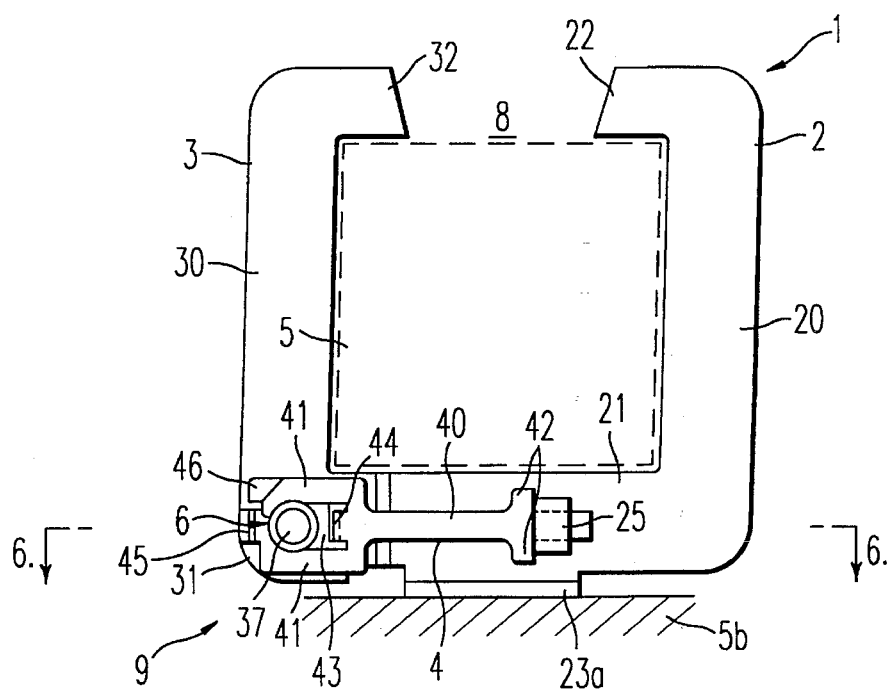
FIG. 4 is an elevation view of a second embodiment of the suspension member.
Figure 5:
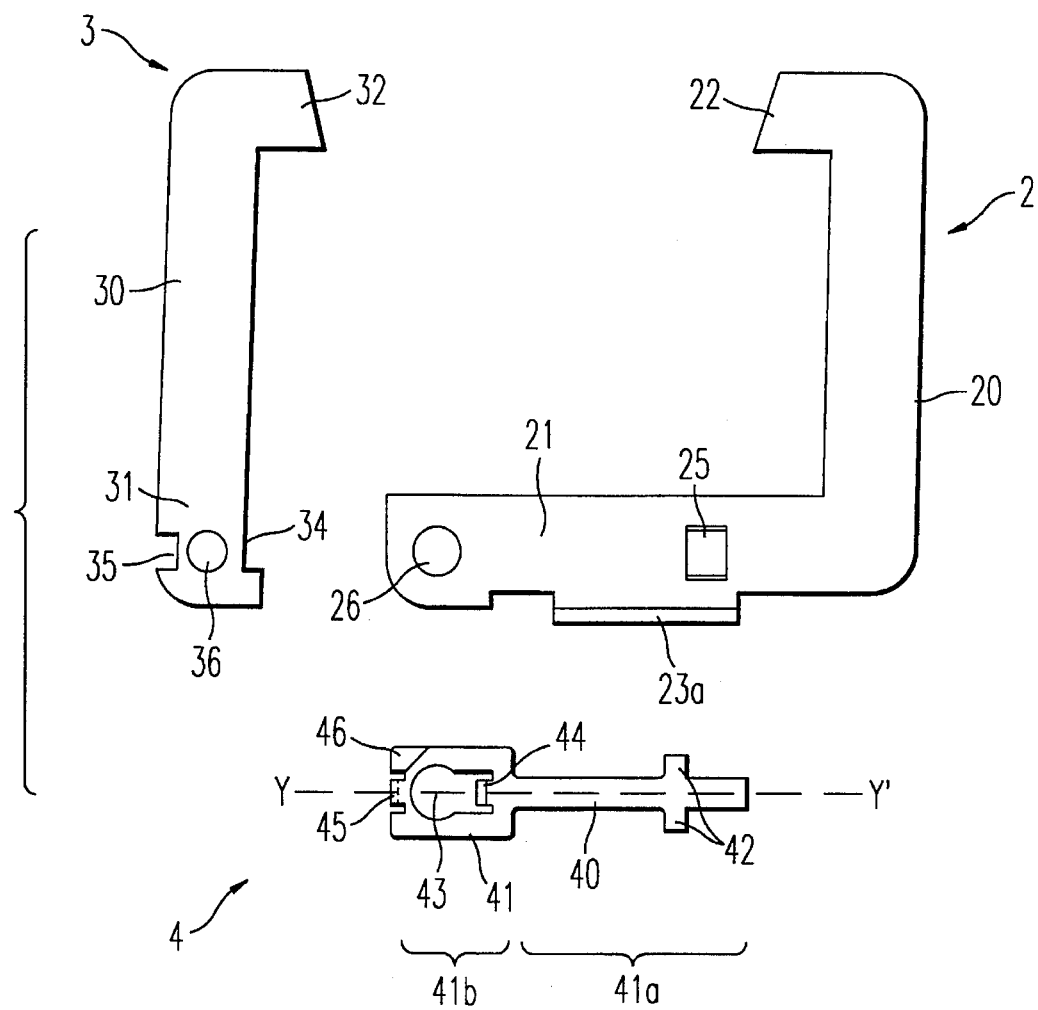
FIG. 5 is an exploded view of FIG. 4.
Figure 6:
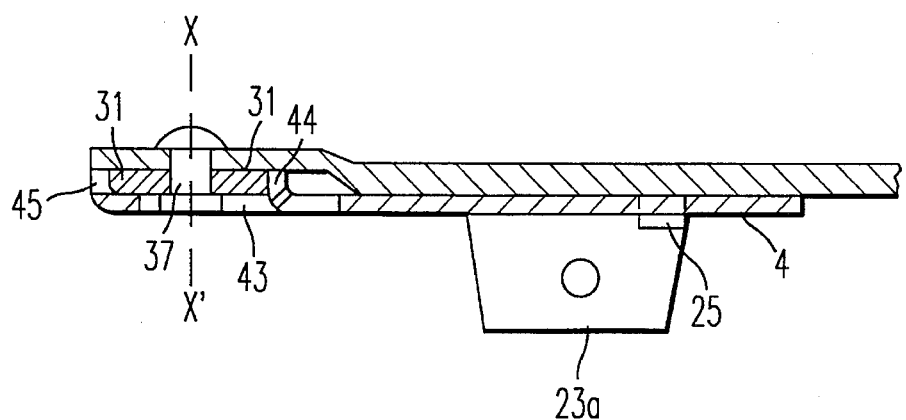
FIG. 6 is a view in section on IV—IV in FIG. 4.

The member shown in FIG. 3 is preferably used to suspend the trunking 5 from the support 5a and the member shown in FIG. 4 is used to suspend the electrical device 5b from the trunking 5. This combined configuration provides a cable path 8 on the top of the trunking so that further cables can be added.

Various suspension members are fixed to the support 5a by screwing the fixing member 23a to it. The trunking can be suspended in this way.

The pivoting clamp 3 is first released to open the stirrup, by raising the tongue 46, for example using a screwdriver, and turning the clamp to the open position. This opens a wide gap between the fixed and mobile attachment projections 22 and 32, into which the trunking 5 is inserted and then pressed against the fixed clamp 2; the flange 21 supports the lower wall 53 of the trunking, the web 20 bears against the side wall 51 or 52 and the attachment projection 22 is pressed against the top wall 54. The clamp 3 is then pivoted towards the opposite side wall 52 or 51 of the trunking and the attachment projection 32 is pressed against the top wall 54. The pivoting clamp is locked when the locking lugs 44, 45 on the spring are engaged in the locking notches 34, 35 on the clamp, so closing the stirrup.

Once the trunking has been fixed, the electrical device 5b can be suspended from it in the same way, after screwing the fixing member 23b to it.

The two attachment projections 22 and 32 of the stirrup face each other and are sufficiently far apart to leave a gap 8 on the top of the trunking which constitutes the cable path 80 in which further cables can be accommodated.

I claim:

1. A suspension member for suspending prefabricated electrical trunking, comprising:

a fixed clamp including a fixing member for fixing the suspension member to a part to which the suspension member is to be connected;

a pivoting clamp pivoted to the fixed clamp at a pivot joint so as to pivot between an open position and a clamping position in which said fixed and pivoting clamps clamp an electrical trunking held in said suspension member, wherein a free end of said pivoting clamp opposite said pivot joint is spaced from said fixed clamp when said pivoting clamp is in the clamping position such that a free space is formed through which elements may be added to or removed from the electrical trunking when said pivoting clamp is in the clamping position; and a locking coupling formed adjacent said pivot joint for locking said pivoting clamp in said clamping position.

2. The suspension member of claim 1 wherein said fixed clamp includes an attachment projection which faces said free end of said pivoting clamp across said free space when said pivoting clamp is in the clamping position.

3. The suspension member of claim 1 wherein said locking coupling comprises a locking member mounted at said pivot joint and which engages said fixed and pivoting clamps to lock said pivoting clamp at the clamping position.

4. The suspension member of claim 3 wherein said locking member comprises a leaf spring mounted to said fixed clamp and having elements which cooperate with said pivoting clamp to prevent the pivoting thereof when the pivoting clamp is in the clamping position.

5. The suspension member of claim 4 wherein said elements which cooperate with said pivoting clamp to prevent the pivoting thereof when the pivoting clamp is in the clamping position comprise locking lugs on one of the leaf spring and the pivoting clamp, the locking lugs cooperating with notches in the other of the leaf spring and the pivoting clamp.

6. The suspension member of claim 5 wherein said leaf spring includes projecting portions by which the leaf spring is mounted to a surface of said fixed clamp.

7. The suspension member of claim 1 wherein said fixed and pivoting clamps are formed of sheet metal.

8. The suspension member of claim 1 wherein said pivot joint comprises a rivet.

* * * * *